S. EVERSHED & W. D. KILROY.
SOUND EMITTER.
APPLICATION FILED MAY 3, 1910.

1,218,934.

Patented Mar. 13, 1917.

Inventors:
Sydney Evershed,
Willie D. Kilroy

UNITED STATES PATENT OFFICE.

SYDNEY EVERSHED AND WILLIE DICKSON KILROY, OF CHISWICK, ENGLAND.

SOUND-EMITTER.

1,218,934.　　　Specification of Letters Patent.　　Patented Mar. 13, 1917.

Application filed May 3, 1910. Serial No. 559,158.

*To all whom it may concern:*

Be it known that we, SYDNEY EVERSHED and WILLIE DICKSON KILROY, subjects of the King of Great Britain and Ireland, and residing at Acton Lane Works, Chiswick, in the county of Middlesex, England, have invented certain new and useful Improvements Relating to Sound-Emitters.

This invention relates to the means by which electric energy is converted into the mechanical energy of sound waves in air, water or other medium of transmission and in this specification the phrase "sound-waves" means any waves propagated like waves of sound and of any frequency whether within the limits of audibility or not. It relates more specifically to electric vibratory motors and their application for signaling to a distance.

The object of our invention is to produce continuous or interrupted trains of sound-waves of considerable intensity, which when propagated to a distance in either air or water may be heard or detected in any known manner and may serve as signals or convey messages by Morse code signaling and the like.

Our invention in brief consists in a vibratory electric motor having a fixed part hereinafter referred to as a "stator", and a movable part, hereinafter referred to as a "vibrator", mechanically coupled to a sound-producing body, hereinafter referred to as a "sounder".

The invention includes the novel features of construction and arrangement of parts hereinafter described and defined by the appended claims, an embodiment of the invention being shown in the accompanying drawings, in which,—

Figure 1:
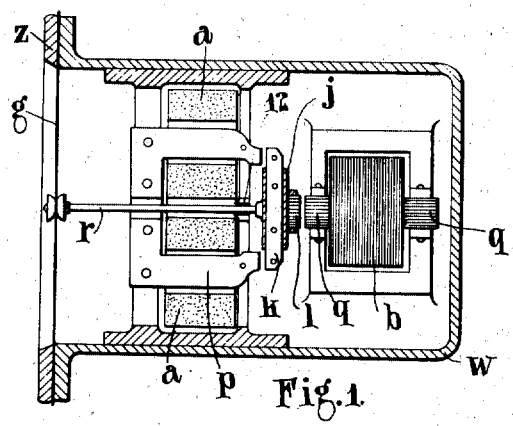
Figure 1 is a longitudinal section.
Figure 2:
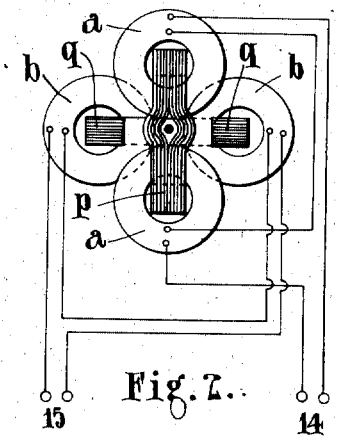
Fig. 2 is a front elevation of the stator magnets of a two phase construction of motor.

Referring now particularly to this drawing which illustrates a construction suitable for two phase working the vibrator is composed of two laminated cores $k$ and $l$, fixed at right angles to each other in the movable frame $j$. These cores are each acted upon by one of two electro-magnets $p$ and $q$, which are formed of laminated iron and magnetized by the coils $aa$ and $bb$. The coils $aa$ are connected in series to the terminals 14, and the coils $bb$ are similarly connected to the terminals 15. One phase of a two-phase alternating current circuit is coupled to the terminals 14, and the other phase to the terminals 15. Each magnet alternately attracts and releases the corresponding core twice in each period of the current, and since the two magnets attract in opposite directions, the resultant reciprocating force upon the vibratory system has a frequency twice that of the alternating current; that is to say, the frequency of vibration of the sounder is twice the frequency of the current. It is essential for efficiency that the two electro-magnets should be fixed in such relative positions as to have no mutual induction between their windings.

The vibratory motor is preferably arranged in a suitable containing case $w$, where one end of the case is closed by an elastic plate $g$, to act as the sounder, clamped by means of a ring $z$. Suitable means can be employed to render the case watertight, so that the sound generator may be used below the surface when it is desired to signal through water.

When the elasticity of the sound generating body is insufficient to give the mass of the vibratory system a natural frequency of vibration equal to the frequency of the alternating current, the additional force required to compel the vibrator to work at the same frequency as the current would be provided—for example—by an idle current flowing in the alternating current windings.

The magnitude of the additional force to be provided (and hence the strength of the idle current) can be estimated, when the natural frequency of the vibratory system is known by means of the formula:

Additional force, at its maximum value $= 4\pi^2 am (F^2 - n^2)$, where $a$ is the amplitude of vibration; $m$ is the mass (or equivalent mass) of the vibratory system; F is the frequency of the current; and $n$ is the natural frequency of the vibratory system. The additional force is assumed to be a sine wave.

It will be understood that various modifications in the structure may be made without departing from the spirit of our invention, which is not limited in construction or manner of use except as required by the appended claims.

Having now described our invention what we claim as new and desire to secure by Letters Patent is:—

1. A sound emitting apparatus comprising in combination a vibratory electromotor having a vibrator composed of two armatures coupled together and disposed at right angles to one another, a stator comprising separate coils adapted when energized to attract alternately the respective armatures, two phase alternating current mains having two terminals, one set of coils being connected in series with one of said terminals and the other set of coils being similarly connected with the other terminal, a vibratory diaphragm and a mechanical connection between said armatures and said diaphragm, substantially as described.

2. A sound emitting apparatus comprising in combination a vibratory electromotor having a stator composed of two sets of windings, a vibrator comprising a movable frame, a pair of armatures carried in said frame and disposed at right angles to each other, a two-phase alternating current main having two terminals, one of said windings being connected in series with one of said terminals and the other winding being similarly connected with the other terminal, a vibratory diaphragm and a rigid bar connecting said movable frame with said diaphragm, substantially as described.

3. A sound-emitting apparatus comprising in combination a vibratory electromotor having a vibrator comprising a double armature formed of parts disposed at right angles to one another, a stator comprising separate coils adapted when energized to attract alternately the respective armatures, means for supplying two-phase alternating current to said armatures one element of the armature being excited from one phase and the other from the other phase, a vibratory diaphragm and a rigid mechanical connection between said vibrator and said diaphragm.

In testimony whereof, we affix our signatures in presence of two witnesses.

SYDNEY EVERSHED.
WILLIE DICKSON KILROY.

Witnesses:
BERTRAM H. MATTHEWS,
C. R. MITCHELSON.